US012580323B2

(12) United States Patent
Kodama

(10) Patent No.: US 12,580,323 B2
(45) Date of Patent: Mar. 17, 2026

(54) CHARGING CASE FOR WIRELESS APPARATUS AND ELECTRONIC DEVICE

(71) Applicant: GOERTEK INC., Shandong (CN)

(72) Inventor: Kenichiro Kodama, Shandong (CN)

(73) Assignee: GOERTEK INC., Shandong (CN)

( * ) Notice: Subject to any disclaimer, the term of this patent is extended or adjusted under 35 U.S.C. 154(b) by 302 days.

(21) Appl. No.: 18/253,248

(22) PCT Filed: Nov. 20, 2020

(86) PCT No.: PCT/CN2020/130404
§ 371 (c)(1),
(2) Date: May 17, 2023

(87) PCT Pub. No.: WO2022/104688
PCT Pub. Date: May 27, 2022

(65) Prior Publication Data
US 2023/0420862 A1        Dec. 28, 2023

(51) Int. Cl.
*H02J 50/10*        (2016.01)
*H01Q 1/22*        (2006.01)
*H01Q 1/27*        (2006.01)
*H01Q 15/02*        (2006.01)
*H02J 7/00*        (2006.01)

(52) U.S. Cl.
CPC ........... *H01Q 15/02* (2013.01); *H01Q 1/2291* (2013.01); *H01Q 1/273* (2013.01); *H02J 7/0044* (2013.01); *H02J 50/10* (2016.02)

(58) Field of Classification Search
CPC ..... H01Q 1/2291; H01Q 1/273; H02J 7/0044; H02J 50/10
See application file for complete search history.

(56) References Cited

U.S. PATENT DOCUMENTS

| | | | |
|---|---|---|---|
| 11,848,484 B2 * | 12/2023 | Lee ........................ | H01Q 1/243 |
| 2010/0277120 A1 | 11/2010 | Cook et al. | |
| 2017/0047635 A1 | 2/2017 | Wolentarski et al. | |
| 2019/0006757 A1 * | 1/2019 | Nikles ...................... | H01Q 7/06 |
| 2020/0221211 A1 * | 7/2020 | Palupunoori ............ | H04R 1/02 |
| 2021/0006889 A1 * | 1/2021 | Geng ................... | H04R 1/1016 |
| 2022/0014044 A1 * | 1/2022 | Manova-Elssibony ...................... H02J 50/005 |

FOREIGN PATENT DOCUMENTS

| | | |
|---|---|---|
| CN | 110324743 A | 10/2019 |
| WO | 2020105056 A1 | 5/2020 |

* cited by examiner

*Primary Examiner* — Dimary S Lopez Cruz
*Assistant Examiner* — Austin M Back
(74) *Attorney, Agent, or Firm* — Ingrassia Fisher & Lorenz, LLP

(57) ABSTRACT
A charging case for a wireless apparatus and an electronic device are provided. The charging case includes a parasitic element. When the wireless apparatus is put into the charging case, the parasitic element is coupled to an antenna of the wireless apparatus. The type, shape, dimension, production, position and number of the parasitic element are not limited, which may be determined based on practical requirements.

15 Claims, 5 Drawing Sheets

Parasitic
element

Parasitic
element

CHARGING CASE FOR WIRELESS APPARATUS AND ELECTRONIC DEVICE

CROSS-REFERENCE TO RELATED APPLICATION

This application is a U.S. National-Stage entry under 35 U.S.C. § 371 based on International Application No. PCT/CN2020/130404, filed Nov. 20, 2020 which was published under PCT Article 21(2), which is hereby incorporated herein in its entirety by reference.

TECHNICAL FIELD

This application pertains to the technical field of wireless communication, and in particular, to a charging case for a wireless apparatus and an electronic device.

BACKGROUND

Recent years, more and more wireless apparatuses, especially wearable apparatuses, are developed to enrich people's life. The wireless apparatuses normally require a charging device for power. For example, a wireless earbud may be charged by a corresponding charging device, and then taken away from the charging device to be worn on a user. In this case, an antenna of the earbud in use is best tuned in a bandwidth, to have high antenna efficiency in the bandwidth. For example, if the earbud is a Bluetooth earbud, the antenna of the earbud is tuned in the Bluetooth bandwidth when the earbud is worn on a human ear. At this point, the antenna of the Bluetooth earbud in use has a high efficiency in the Bluetooth bandwidth, as shown in FIG. 1A.

After that, when the earbud is put back to the charging case, the antenna efficiency in the bandwidth significantly drops because the frequency characteristic of the antenna is sensitive to the electromagnetic environment. For example, when the Bluetooth earbud is put back to its charging case, since the electromagnetic environment of the Bluetooth earbud is changed (i.e., from the ear to the charging case), the frequency characteristic of the Bluetooth earbud is changed as well. FIG. 1B shows a changed curve of a frequency characteristic of an antenna of the Bluetooth earbud when the Bluetooth earbud is put back in a charging case. Specifically, the curve of the frequency characteristic may shift to right, so that the antenna efficiency drops in the Bluetooth bandwidth, as shown in FIG. 1B. This drop may have an impact on the subsequent use of the earbud. For example, the subsequent pairing for the earbud may be affected.

In view of this, it is desired to provide a solution to reduce or eliminate the drop of antenna efficiency in a used bandwidth when a wireless apparatus is put back to a charging case. In addition, other objects, desirable features and characteristics will become apparent from the subsequent summary and detailed description, and the appended claims, taken in conjunction with the accompanying drawings and this background.

SUMMARY

An objective of the present disclosure is to provide a charging case for a wireless apparatus to reduce or eliminate the drop of antenna efficiency in a used bandwidth when the wireless apparatus is put back to a charging case.

In an aspect of the present disclosure, a charging case for a wireless apparatus is provided, including a parasitic element configured to be coupled to an antenna of the wireless apparatus when the wireless apparatus is put inside the charging case.

In an embodiment, when the wireless apparatus is outside the charging box, an antenna efficiency of the antenna in a bandwidth is a first antenna efficiency; and when the wireless apparatus is inside the charging box, the antenna efficiency of the antenna in the bandwidth is a second antenna efficiency equal to or higher than the first antenna efficiency.

In an embodiment, the first antenna efficiency of the antenna is an antenna efficiency when the wireless apparatus is wore on a human body.

In an embodiment, the bandwidth is a Bluetooth bandwidth, a wireless fidelity (Wi-fi) bandwidth, or a global positioning system (GPS) bandwidth.

In an embodiment, the parasitic element is of a non-grounding type or a grounding type.

In an embodiment, the parasitic element is in a rectangular shape, a round shape, a trapezoid shape, or a U-shape.

In an embodiment, a maximum dimension of the parasitic element is in a range of $\lambda/4$ to $\lambda$, where $\lambda$ represents a wavelength of the antenna of the wireless apparatus.

In an embodiment, the parasitic element is of a non-grounding type and in a shape of rectangle having a length of $\lambda/2$, or the parasitic element is of a grounding type and in a shape of rectangle having a length of $\lambda/4$.

In an embodiment, the parasitic element is a flexible printed circuit (FPC), a laser direct-structuring (LDS) element, or a metal plate.

In an embodiment, the charging case includes at least one recess for accommodating the wireless apparatus. The parasitic element is arranged on an outer surface of the charging case, or the parasitic element is arranged inside the charging case.

In an embodiment, the charging case includes a top part and a bottom part. The recess is arranged on a side of the top part facing to the bottom part, and/or arranged on a side of the bottom part facing to the top part.

In an embodiment, the parasitic element is arranged on the top part.

In an embodiment, in a case that top part is arranged with the recess, the parasitic element is arranged on a side of the top part where the recess of the top part is arranged, or arranged on a side of the top part that intersects with the side of the top part where the recess is arranged.

In an embodiment, the parasitic element is arranged on the bottom part.

In an embodiment, in a case that bottom part is arranged with the recess, the parasitic element is arranged on a side of the bottom part where the recess of the top part is arranged, or arranged on a side of the bottom part that intersects with the side of the bottom part where the recess is arranged.

In an embodiment, the parasitic element is arranged on both the top part and the bottom part.

In an embodiment, the charging case includes N recesses for accommodating N wireless apparatuses, and the charging case includes one parasitic element arranged at a position having equal distances to the N recesses, where N is an integer equal to or greater than 1.

In an embodiment, the charging case includes N recesses for accommodating N wireless apparatuses, the N recesses are arranged symmetrically about a symmetrical plane, and the charging case includes M parasitic elements arranged at positions symmetrical about the symmetrical plane, where M and N are even numbers equal to or greater than 2.

In an embodiment, N is equal to 2.

In another aspect of the present disclosure, an electronic device is provided, including any charging case described above, and including the wireless apparatus having the antenna. The charging case is configured to charge the wireless apparatus.

In an embodiment, the wireless apparatus is a wireless wearable device.

In an embodiment, the wireless apparatus is a Bluetooth device, a wireless fidelity (Wi-fi) device, or a global positioning system (GPS) device.

In an embodiment, the wireless apparatus is a Bluetooth earbud.

According to the above embodiments of the present disclosure, the charging case for a wireless apparatus includes a parasitic element. When the wireless apparatus is put into the charging case, the parasitic element is coupled to an antenna of the wireless apparatus. The parasitic element can change the electromagnetic environment in the charging case, so as to reduce or prevent the drop of antenna efficiency of the antenna of the wireless device in the used bandwidth, facilitating subsequent use of the wireless device. The type, shape, dimension, production, position and number of the parasitic element are not limited in the present disclosure, which may be determined based on practical requirements.

BRIEF DESCRIPTION OF THE DRAWINGS

The present invention will hereinafter be described in conjunction with the following drawing figures, wherein like numerals denote like elements, and.

DETAILED DESCRIPTION OF THE EMBODIMENTS

The following detailed description is merely exemplary in nature and is not intended to limit the invention or the application and uses of the invention. Furthermore, there is no intention to be bound by any theory presented in the preceding background of the invention or the following detailed description.

To make the object, technical solutions and advantages of the present application clearer, hereinafter technical solutions in embodiments of the present disclosure are described clearly and completely in conjunction with the drawings in embodiments of the present closure. Apparently, the described embodiments are only some rather than all of the embodiments of the present disclosure. Any other embodiments obtained based on the embodiments of the present disclosure by those skilled in the art without any creative effort fall within the scope of protection of the present disclosure.

To address the problem of the drop of antenna efficiency in a used bandwidth when a wireless apparatus is put back to a charging case, an improved charging box is provided according to embodiments of the present disclosure.

Figure 2:
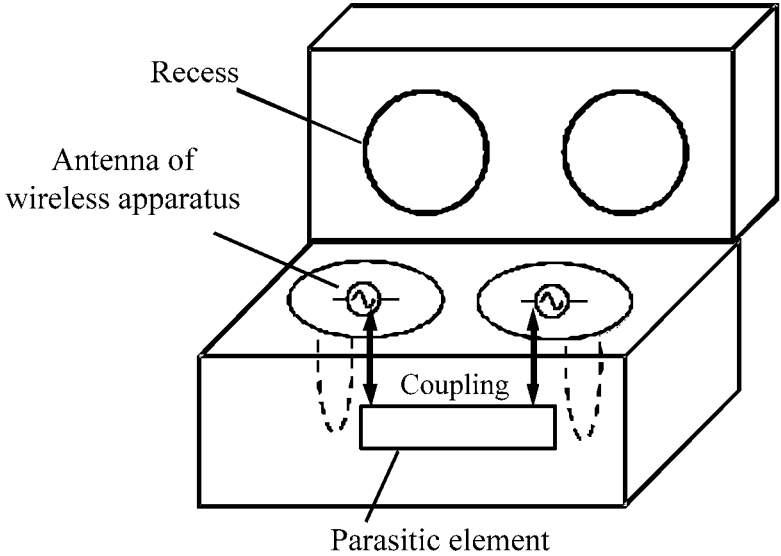
FIG. 2 shows a charging case for a wireless apparatus according to an embodiment of the present disclosure.

FIG. 2 shows a charging case for a wireless apparatus according to an embodiment of the present disclosure. In the embodiment of the present disclosure, a charging box for a wireless apparatus includes a parasitic element. When the wireless apparatus is put into the charging case, the parasitic element is coupled to an antenna of the wireless apparatus, as shown in FIG. 2. Compared with the charging box in the conventional technology, the parasitic element changes the electromagnetic environment in the charging case, so as to simulate the usage environment.

In some embodiments, the electromagnetic environment in the charging case with the parasitic element may be similar to the electromagnetic environment outside the charging case. For example, the electromagnetic environment in the charging case with the parasitic element may be similar to the electromagnetic environment of wireless apparatus in use, such as the human ear. In other words, when the parasitic element is coupled to the antenna of the wireless apparatus, an antenna efficiency of the antenna is same as or similar to a first antenna efficiency of the antenna when the wireless apparatus is outside the charging case. For example, the first antenna efficiency may be an antenna efficiency of the antenna when the wireless apparatus is worn on a human body, such as the human ear.

Figure 1A:
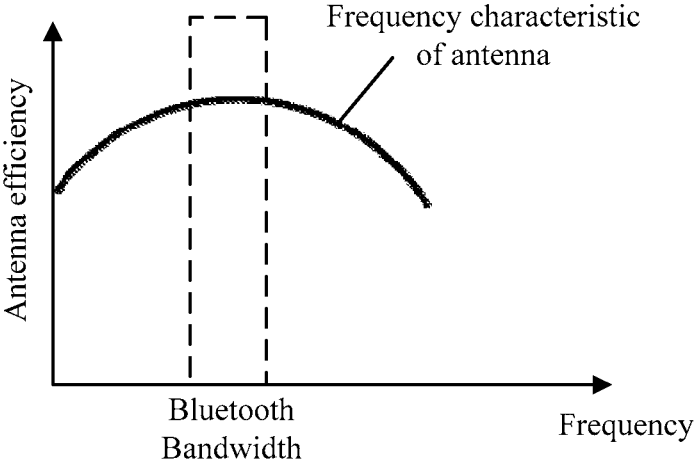
FIG. 1A shows a curve of a frequency characteristic of an antenna of a Bluetooth earbud when the Bluetooth earbud is worn in a human ear.
Figure 1B:
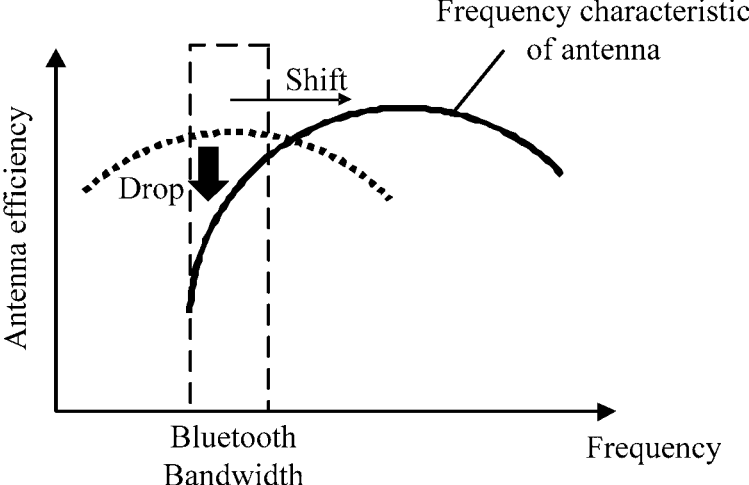
FIG. 1B shows a changed curve of a frequency characteristic of an antenna of a Bluetooth earbud when the Bluetooth earbud is put back in a charging case of the conventional technology.

Still taking the Bluetooth earbud as an example, when the Bluetooth earbud is put back to its charging case without the parasitic element, the curve of the frequency characteristic of the antenna of the Bluetooth earbud may shift to left, so that the antenna efficiency drops in the Bluetooth bandwidth, as shown in FIG. 1B. By arranging the parasitic element in the charging case, the parasitic element is coupled to the antenna of the Bluetooth earbud when the Bluetooth earbud is put back into the charging case, so that the electromagnetic environment in the charging case may be similar to the electromagnetic environment in the human ear, thereby reducing or preventing the shift of the frequency characteristic of the antenna, and thus reducing or preventing the drop of antenna efficiency in the Bluetooth bandwidth. Therefore, the antenna of the Bluetooth earbud can keep the high antenna efficiency in the Bluetooth bandwidth when the Bluetooth earbud is put back in the charging case.

Figure 1C:
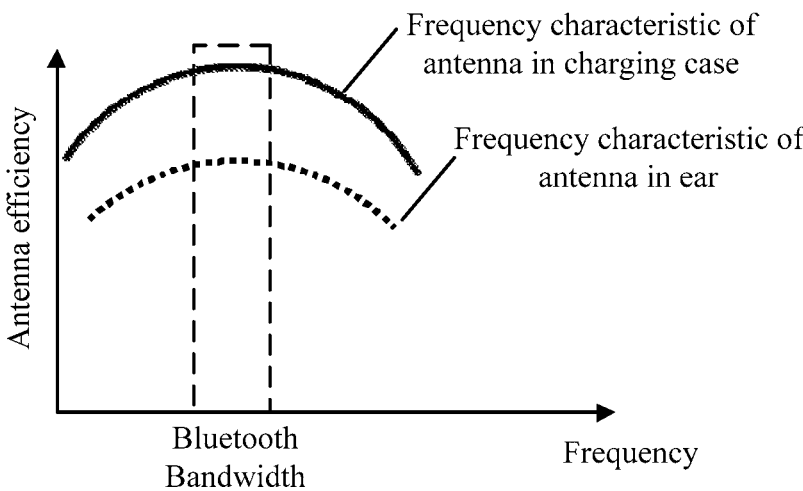
FIG. 1C shows curves of frequency characteristics of an antenna of a Bluetooth earbud when the Bluetooth earbud is worn in the ear and when the Bluetooth earbud is put back in a charging case according to an embodiment of the present disclosure.

Furthermore, in the Bluetooth bandwidth, the antenna efficiency of the Bluetooth earbud in the charging case can be even better than that in the human ear, because in the charging case there is no loss caused by human body. FIG. 1C shows curves of frequency characteristics of an antenna of a Bluetooth earbud when the Bluetooth earbud is worn in the ear and when the Bluetooth earbud is put back in a charging case according to an embodiment of the present disclosure. As shown in FIG. 1C, in the Bluetooth bandwidth, the antenna efficiency of the Bluetooth earbud in the charging case is higher than that in the human ear.

It should be noted that, although FIG. 2 shows the earbuds as the wireless apparatuses, the wireless apparatus is not limited thereto. For example, the wireless apparatus may be a necklace, a ring, a wristband, or glasses. Furthermore, the bandwidth is not limited to the Bluetooth bandwidth, but may be any wireless bandwidth, such as the wireless fidelity (Wi-fi) bandwidth, or the global positioning system (GPS) bandwidth.

The parasitic element may be in any types, such as a non-grounding type or a grounding type. Also, the parasitic element may be in any shapes, such as a rectangular shape, a round shape, a trapezoid shape, and a U-shape. Furthermore, the dimensions of the parasitic element are not limited in the present disclosure, which can be determined according to actual requirements.

In some embodiments, for any shapes of the parasitic element, the maximum dimension of the parasitic element is in a range of $\lambda/4$ to $\lambda$, where $\lambda$ represents a wavelength of the antenna of the wireless apparatus.

For example, when the parasitic element is in a rectangular shape, the length of the parasitic element is equal to $\lambda/2$ if the parasitic element is of the non-grounding type, or is equal to $\lambda/4$ if the parasitic element is of the grounding type.

The parasitic element may be made of metal in any forms. For example, the parasitic element may be a flexible printed circuit (FPC), a laser direct-structuring (LDS) element, or a metal plate.

The parasitic element may be arranged at any position on the charging case.

In some embodiments, the charging case may include at least one recess for accommodating the wireless apparatus, as shown in FIG. 2. The parasitic element may be arranged on an outer surface of the charging case. Alternatively, the parasitic element may be arranged inside the charging case.

In some embodiments, the charging case includes a top part and a bottom part. The top part and the bottom part can be closed together and opened by a connecting piece. The recess is arranged on a side of the top part facing to the bottom part, and/or arranged on a side of the bottom part facing to the top part. For example, as shown in FIG. 3A to 5B, the recesses are arranged on both the side of the top part facing to the bottom part and the side of the bottom part facing to the top part. The parasitic element may be arranged on the top or bottom part, or arranged on both of the top and bottom parts.

Figure 3A:
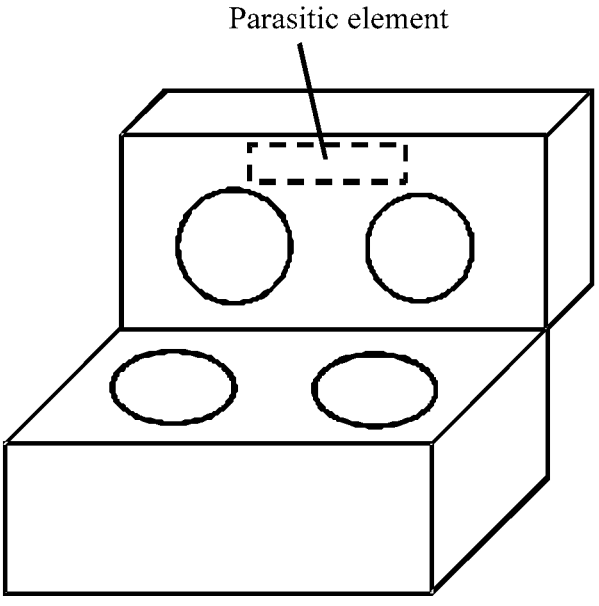
FIG. 3A shows a position of a parasitic element on a top part according to an embodiment of the present disclosure.
Figure 3B:
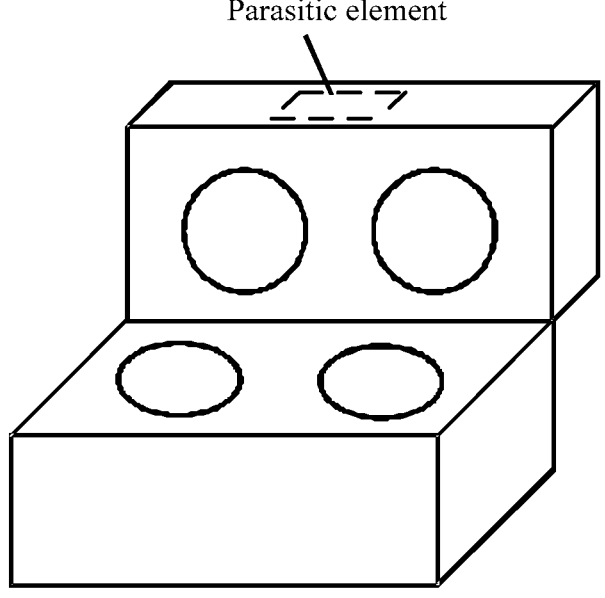
FIG. 3B shows a position of a parasitic element on a top part according to an embodiment of the present disclosure.

For example, in some embodiments, the top part of the charging case includes a recess for accommodating the wireless apparatus, and the parasitic element is arranged on the top part. The parasitic element may be arranged on a side of the top part where the recess of the top part is arranged, as shown in FIG. 3A. Alternatively, the parasitic element may be arranged on a side of the top part that intersects with the side of the top part where the recess is arranged, as shown in FIG. 3B.

Figure 4A:
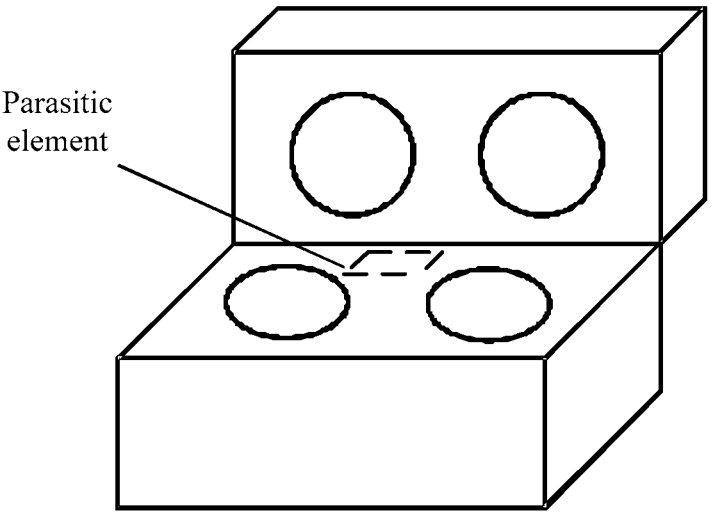
FIG. 4A shows a position of a parasitic element on a bottom part according to an embodiment of the present disclosure.
Figure 4B:
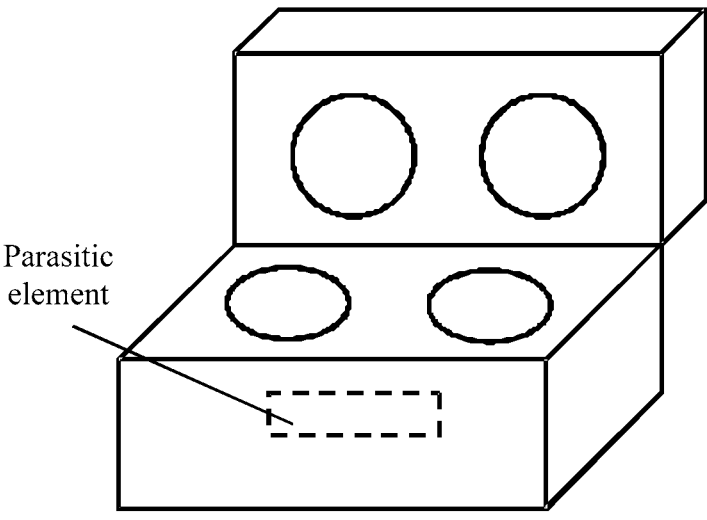
FIG. 4B shows a position of a parasitic element on a bottom part according to an embodiment of the present disclosure.

Similarly, in some embodiments, the bottom part of the charging box includes a recess for accommodating the wireless apparatus, and the parasitic element is arranged on the bottom part, as shown in FIGS. 4A and 4B. The parasitic element may be arranged on a side of the bottom part where the recess of the top part is arranged, as shown in FIG. 4A. Alternatively, the parasitic element may be arranged on a side of the bottom part that intersects with the side of the bottom part where the recess is arranged, as shown in FIG. 4B.

In some embodiments, the top part and the bottom part each include at least one recess for accommodating the wireless apparatus, and the parasitic element may be arranged on the top or bottom part, or arranged on both of the top and bottom parts.

The charging case may be arranged with any number of recesses, and any number of parasitic elements.

In some embodiments, as show in FIGS. 3A and 3B, the top part of the charging case includes one parasitic element and any number of recesses. The one parasitic element is arranged at a position having equal distances to the recesses. For example, as show in FIGS. 4A and 4B, the bottom part of the charging case includes one parasitic element and two recesses. The one parasitic element is arranged at a position having equal distances to the two recesses.

For example, the parasitic element may be arranged at a central position between the two recesses on a side where the two recesses are arranged, that is, the center of the parasitic element may be located on a central line between the two recesses. For another example, the parasitic element may be arranged on a side of the bottom part that intersects with a side where the two recesses are arranged, and the center of the parasitic element has equal distance to the two recesses.

In some embodiments, the top part or the bottom part of the charging case includes M parasitic elements and N recesses, where M and N are even numbers equal to or greater than 2. The N recesses are arranged symmetrically about a symmetrical plane, and the M parasitic elements may be arranged at positions symmetrical about the same symmetrical plane.

Figure 5A:
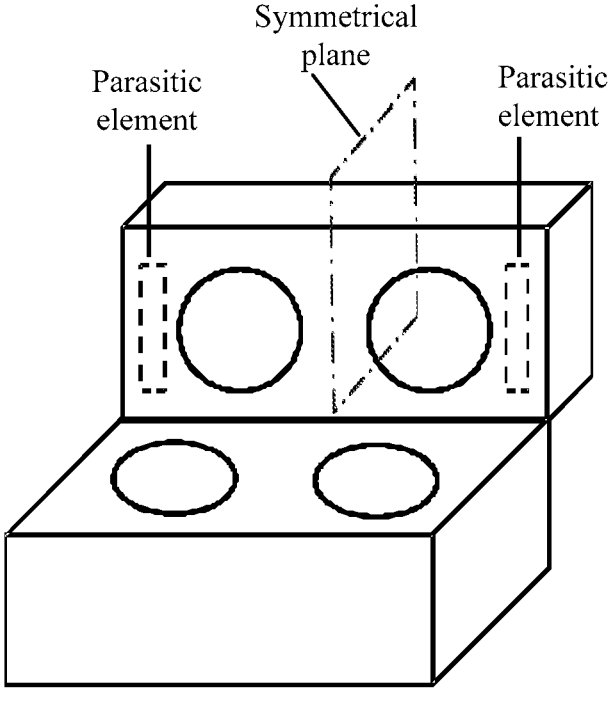
FIG. 5A shows positions of two parasitic elements and two recesses on a top part according to an embodiment of the present disclosure.

For example, as shown in FIG. 5A, the top part of the charging case includes two recesses and two parasitic elements. The two recesses are arranged symmetrically about a symmetrical plane S, and the two parasitic elements are also arranged symmetrically about the symmetrical plane S. For example, the two parasitic elements may be arranged respectively at two sides of the two recesses. That is, one parasitic element is arranged on the left side of the left recess, and the other parasitic element is arranged on the right side of the right recess.

Figure 5B:
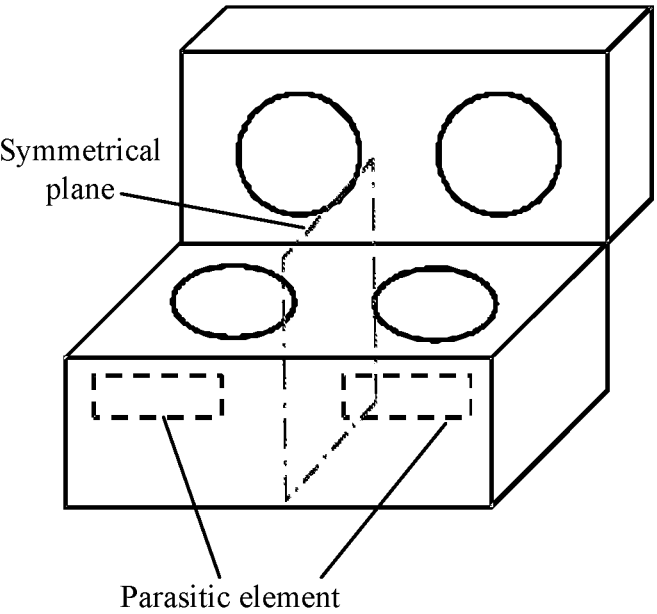
FIG. 5B shows positions of two parasitic elements and two recesses on a bottom part according to an embodiment of the present disclosure.

For another example, as shown in FIG. 5B, the bottom part of the charging case includes two recesses which are arranged symmetrically about a symmetrical plane S. The two parasitic elements may be arranged respectively at positions directly blow the two recesses, on a side of the bottom part that intersects with the side of the bottom where the two recesses are located, so that the two parasitic elements are also symmetrical about the symmetrical plane S.

According to the above embodiments of the present disclosure, the charging case for a wireless apparatus includes a parasitic element. When the wireless apparatus is put into the charging case, the parasitic element is coupled to an antenna of the wireless apparatus. The parasitic element can change the electromagnetic environment in the charging case, so as to reduce or prevent the drop of antenna efficiency of the antenna of the wireless device in the used bandwidth, facilitating subsequent use of the wireless device. The type, shape, dimension, production, position and number of the parasitic element are not limited in the present disclosure, which may be determined based on practical requirements.

On the basis of the above embodiments, an electronic device is further provided. The electronic device includes a wireless apparatus and a charging case for charging the wireless apparatus. The charging case may be implemented as any one of the above embodiments of the charging case. The wireless apparatus may be a wireless wearable device. For example, the wireless apparatus is a wireless earbud. The wireless apparatus may operate in any bandwidth, such as a Bluetooth bandwidth.

It should be noted that the described embodiments are only some rather than all embodiments of the present disclosure. All other embodiments acquired by those skilled in the art based on the embodiments of the present disclosure without any creative work fall within the protection scope of the present disclosure.

It should be noted that, the relationship terms such as "first", "second" and the like are only used herein to distinguish one entity or operation from another, rather than to necessitate or imply that an actual relationship or order exists between the entities or operations. Furthermore, the terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device other than enumerated elements.

The embodiments of the present disclosure are described in a progressive manner, and each embodiment places emphasis on the difference from other embodiments. Therefore, one embodiment can refer to other embodiments for the same or similar parts.

According to the description of the disclosed embodiments, those skilled in the art can implement or use the present disclosure. Various modifications made to these embodiments may be obvious to those skilled in the art, and the general principle defined herein may be implemented in other embodiments without departing from the spirit or scope of the present disclosure. Therefore, the present disclosure is not limited to the embodiments described herein but confirms to a widest scope in accordance with principles and novel features disclosed in the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A charging case for a wireless apparatus, comprising:
a parasitic element configured to be coupled to an antenna of the wireless apparatus when the wireless apparatus is put inside the charging case,
the parasitic element is of a non-grounding type and in a shape of rectangle having a length of $\lambda/2$, where $\lambda$ represents a wavelength of the antenna of the wireless apparatus,

wherein when the wireless apparatus is outside the charging case, an antenna efficiency of the antenna in a bandwidth is a first antenna efficiency;
when the wireless apparatus is inside the charging case, the antenna efficiency of the antenna in the bandwidth is a second antenna efficiency equal to or higher than the first antenna efficiency; and
the first antenna efficiency of the antenna is the antenna efficiency when the wireless apparatus is wore on a human body.

2. The charging case according to claim 1, wherein the bandwidth is a Bluetooth bandwidth, a wireless fidelity (Wi-fi) bandwidth, or a global positioning system (GPS) bandwidth.

3. The charging case according to claim 1, wherein the parasitic element is in a rectangular shape, a round shape, a trapezoid shape, or a U-shape.

4. The charging case according to claim 1, wherein, the parasitic element is a flexible printed circuit (FPC), a laser direct-structuring (LDS) element, or a metal plate.

5. The charging case according to claim 1, comprising:
at least one recess for accommodating the wireless apparatus, wherein the parasitic element is arranged on an outer surface of the charging case, or the parasitic element is arranged inside the charging case.

6. The charging case according to claim 5, comprising:
a top part and a bottom part, wherein the recess is arranged on a side of the top part facing to the bottom part, and/or arranged on a side of the bottom part facing to the top part.

7. The charging case according to claim 6, wherein the parasitic element is arranged on the top part.

8. The charging case according to claim 7, wherein in a case that top part is arranged with the recess, the parasitic element is arranged on a side of the top part where the recess of the top part is arranged, or arranged on a side of the top part that intersects with the side of the top part where recess is arranged.

9. The charging case according to claim 6, wherein the parasitic element is arranged on the bottom part.

10. The charging case according to claim 9, wherein in a case that bottom part is arranged with the recess, the parasitic element is arranged on a side of the bottom part where the recess of the top part is arranged, or arranged on a side of the bottom part that intersects with the side of the bottom part where the recess is arranged.

11. The charging case according to claim 6, wherein the parasitic element is arranged on both the top part and the bottom part.

12. The charging case according to claim 5, wherein the charging case comprises N recesses for accommodating N wireless apparatuses, and
the charging case comprises one parasitic element arranged at a position having equal distances to the N recesses, where N is an integer equal to or greater than 1.

13. The charging case according to claim 5, wherein the charging case comprises N recesses for accommodating N wireless apparatuses, the N recesses are arranged symmetrically about a symmetrical plane, and
the charging case comprises M parasitic elements arranged at positions symmetrical about the symmetrical plane, where M and N are even numbers equal to or greater than 2.

14. The charging case according to claim 12, wherein N is equal to 2.

15. An electronic device, comprising:

the charging case according to claim 1; and the wireless apparatus comprising the antenna, wherein the charging case is configured to charge the wireless apparatus.

* * * * *